United States Patent
Harada

(10) Patent No.: US 7,372,462 B2
(45) Date of Patent: May 13, 2008

(54) THREE-DIMENSIONAL GEOMETRY PROCESSING SYSTEM AND METHOD FOR CAD APPARATUS RESTRICTED IN SURFACE REPRESENTATIONS TO IMPORT SOLID DATA

(75) Inventor: Masanori Harada, Tokyo-to (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 11/374,021

(22) Filed: Mar. 14, 2006

(65) Prior Publication Data
US 2006/0202987 A1   Sep. 14, 2006

(30) Foreign Application Priority Data
Mar. 14, 2005   (JP)   ............................ 2005-071498

(51) Int. Cl.
*G06T 17/00* (2006.01)
(52) U.S. Cl. ...................................... 345/424
(58) Field of Classification Search ................. 345/424
See application file for complete search history.

(56) References Cited
FOREIGN PATENT DOCUMENTS

JP   2000-231580 A   8/2000
JP   2001-028061 A   1/2001

OTHER PUBLICATIONS

Lorensen et al., "Marching Cubes: A High Resolution 3D Surface Construction Algorithm", 1987, ACM, pp. 163-169.*
Hiroshi Toriya, et al. "Basics and Applications of Three-Dimensional CAD", (1991), p. 133.

* cited by examiner

Primary Examiner—Almis R. Jankus
(74) Attorney, Agent, or Firm—Dickstein Shapiro LLP

(57) ABSTRACT

A three-dimensional geometry processing system and method for converting boundary representations solid data in a first format into output solid data in a second format which includes a surface conversion and division mechanism configured to convert surface information in the boundary representations solid data into geometry data, and divide a surface which needs to be divided according to restriction of the second format to generate topology information of the divided surfaces, a topology information addition mechanism configured to map topology information of the boundary representations solid data to the topology information of the divided surfaces, and a surface join mechanism configured to join the divided surfaces based on the mapped topology information to generate the output solid data in the second format.

9 Claims, 5 Drawing Sheets

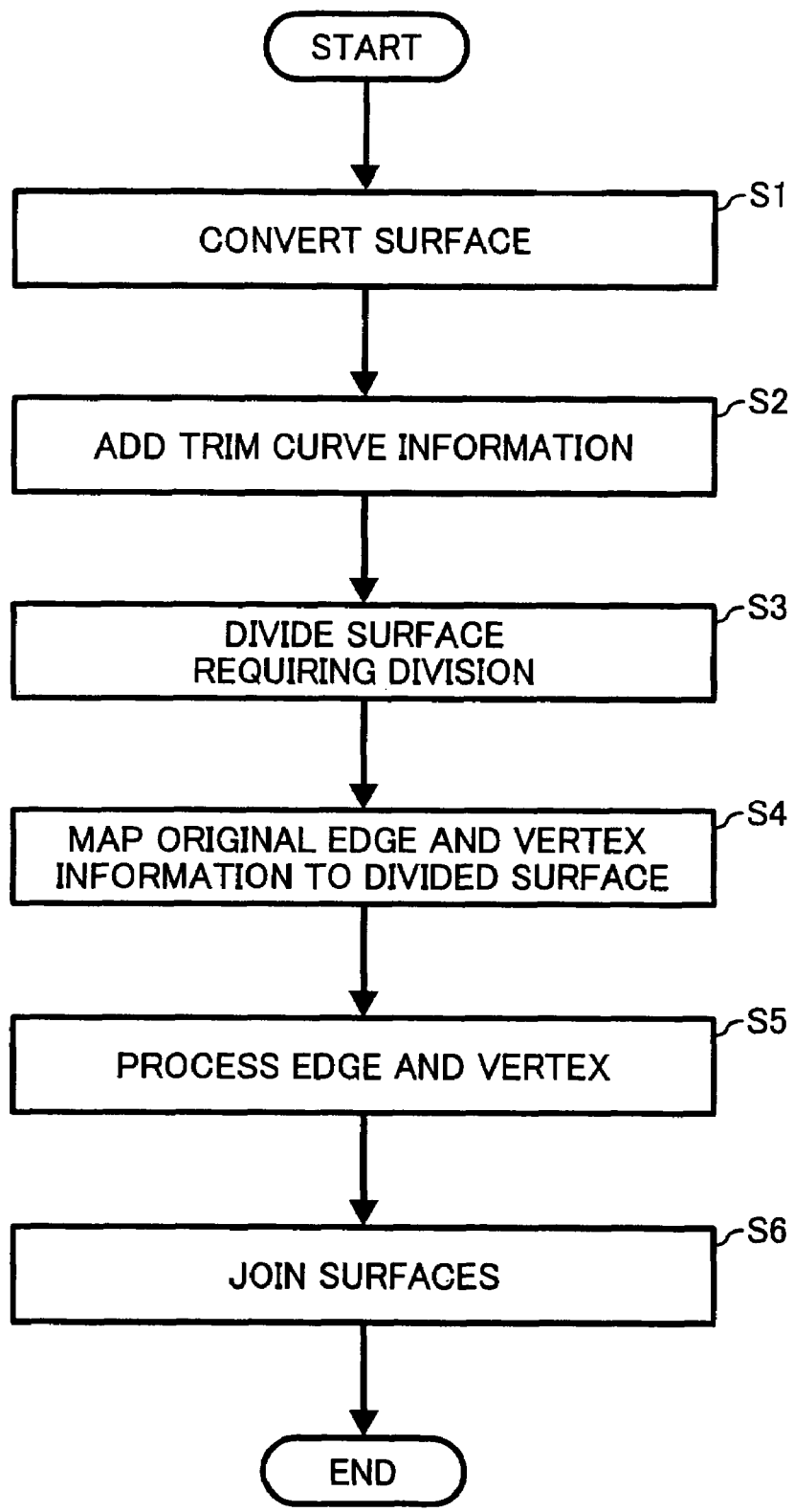

US 7,372,462 B2

THREE-DIMENSIONAL GEOMETRY PROCESSING SYSTEM AND METHOD FOR CAD APPARATUS RESTRICTED IN SURFACE REPRESENTATIONS TO IMPORT SOLID DATA

CROSS-REFERENCE TO RELATED APPLICATIONS

This patent application is based on and claims priority to Japanese patent application No. JP2005-071498, filed on Mar. 14, 2005 in the Japan Patent Office, the entire contents of which are incorporated by reference herein.

BACKGROUND OF THE INVENTION

1. Field of the Invention

The present invention relates to a three-dimensional geometry processing system and method, and more particularly to a three-dimensional geometry processing system and method for a solid computer-aided design (CAD) apparatus restricted in surface representations to import solid data in boundary representations.

2. Discussion of the Background

Practical three-dimensional computer-aided design (CAD) apparatuses mainly deal with solid data. Most of the three-dimensional CAD apparatuses deal with the solid data in boundary representations. The three-dimensional CAD apparatuses generally exchange data in a standard format such as IGES. Generally, when the standard format is used for data exchange, a system which receives data joins surfaces to generate solid data from information on surfaces only. Recently, solid data can be represented in the standard format, and the solid data can be exchanged as is.

Exchanging solid data mainly involves two technical difficulties. The difficulties are related to accuracy and restriction in representations of a CAD apparatus for receiving data. When the CAD apparatus has relatively high accuracy, there can be an exchanging data problem related to accuracy. However, a modification mechanism has been developed to overcome the difficulty related to accuracy. For example, a solid data modification method is available. In the solid data modification method, when there is a deviation from a tolerable range of a target system or a gap at a vertex portion or between a boundary curve and a surface, the gap between an end point and another end point, or between the boundary curve and the surface is filled so that data can be within the tolerable range of the target system having high accuracy. In detail, coordinates of end points of boundary curves of faces representing a shell of a solid are expected to meet at the vertex portion. When the gap between the coordinates is out of the tolerable range of the target system, however, a coordinate of a vertex is determined within the tolerable range based on the end points of the boundary curves gathering at the vertex portion and information of coordinates on a surface corresponding to the end points. Then, the boundary curves are modified so as to have the coordinate of the vertex as the end points thereof. Further, when the gap between the boundary curve and the surface is out of the tolerable range, a geometry of the surface is changed so that the boundary curve and the surface mate within the tolerable range of the target system.

SUMMARY OF THE INVENTION

This patent specification describes a three-dimensional geometry processing system for converting boundary representations solid data in a first format into output solid data in a second format, including a surface conversion and division mechanism configured to convert surface information in the boundary representations solid data into geometry data, and divide a surface which needs to be divided according to restriction of the second format to generate topology information of the divided surfaces, a topology information addition mechanism configured to map topology information of the boundary representations solid data to the topology information of the divided surfaces, and a surface join mechanism configured to join the divided surfaces based on the mapped topology information to generate the output solid data in the second format.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a flowchart of procedures of the three-dimensional processing system;

DETAILED DESCRIPTION OF PREFERRED EMBODIMENTS

Figure 1:
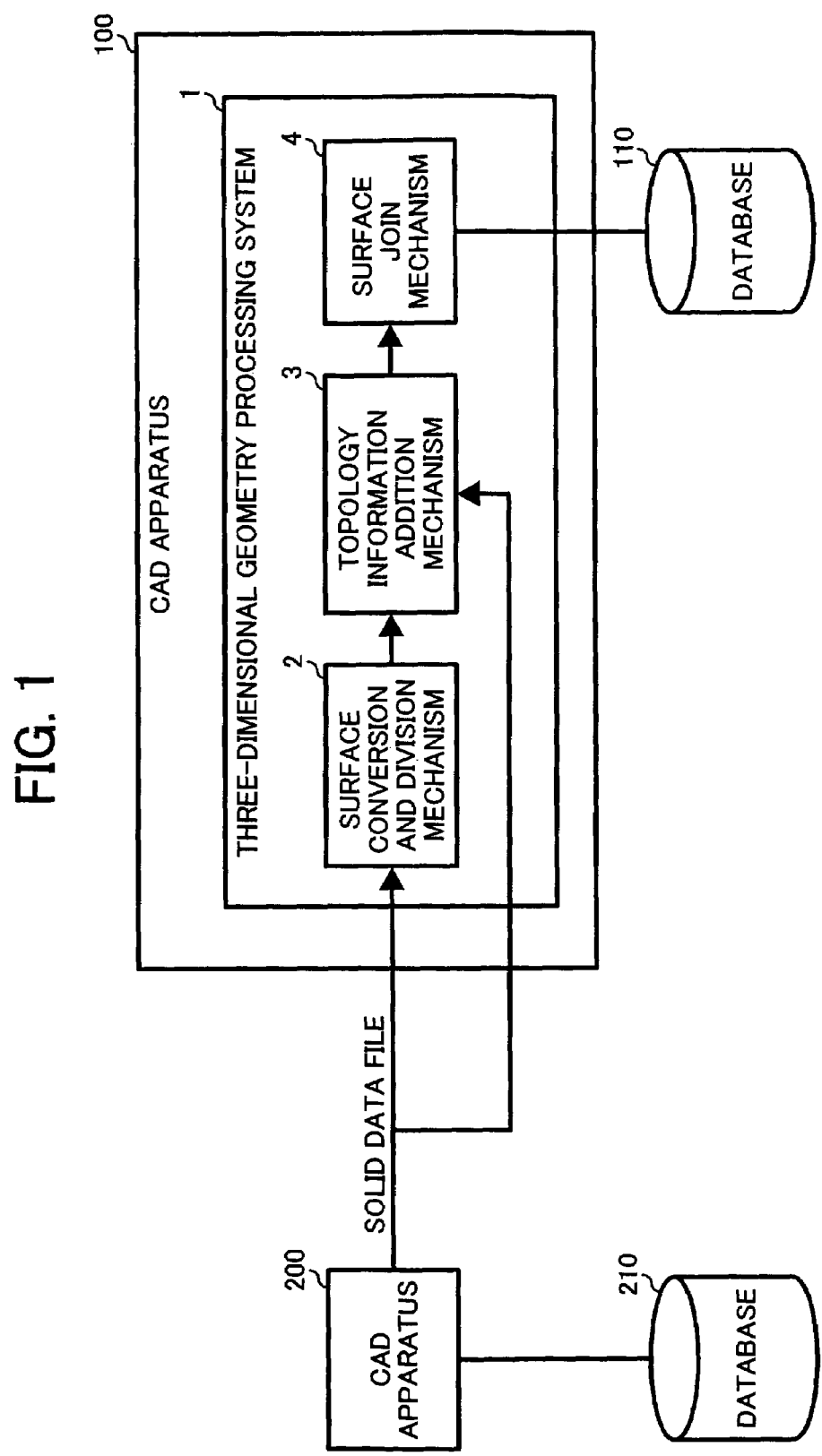
FIG. 1 is a diagram illustrating a configuration of a three-dimensional geometry processing system according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a three-dimensional geometry processing system according to a preferred embodiment of the present invention is described.

A general configuration of the three-dimensional geometry processing system according to the embodiment of the present invention is described below referring to FIG. 1. As shown in FIG. 1, a CAD apparatus 100 includes a three-dimensional (hereinafter referred to as 3D) geometry processing system 1, and is connected with a database 110. The 3D geometry processing system 1 includes a surface conversion and division mechanism 2, a topology information addition mechanism 3, and a surface join mechanism 4.

A CAD apparatus 200 having a database 210 outputs data in a solid data file (i.e., format 1). The 3D geometry processing system 1 receives the data from the CAD apparatus 200, and converts the data into another format (i.e., format 2).

Functions of the 3D geometry processing system 1 according to an embodiment of the present invention are described below.

The 3D geometry processing system 1 receives the solid data file (hereinafter also referred to as original data) output from the CAD apparatus 200, converts solid data in the file into output data in the format of the CAD apparatus 100, and sends the output data to the database 110 of the CAD apparatus 100.

The surface conversion and division mechanism 2 converts surface data of the original data into geometry data, adds trim boundary curve information thereto, divides an original surface which needs to be divided according to restriction of the format 2, and generates topology information of the divided surfaces. The topology information addition mechanism 3 maps topology information of the original data to the topology information of the divided surfaces, and performs edge and vertex processing. The surface join mechanism 4 joins the divided surfaces, and restores the solid data.

The solid data file output from the CAD apparatus 200 may be in one of standard formats such as an initial graphics exchange specification (IGES) file and other formats.

The 3D geometry processing system 1 operates as described below. While converting the surface information of the original data into the geometry data, the surface conversion and division mechanism 2 divides the original surface which cannot be processed by the CAD apparatus 100, and generates the topology information of the divided surfaces together with boundary curve information of the surface which can be obtained from the topology information of the original data. The topology information addition mechanism 3 performs mapping between the generated topology information of the surface and the topology information of the original data, and performs the edge and vertex processing. After the above operations are finished on all surfaces in the original data, the surface join mechanism 4 joins the divided surfaces according to the topology information added to the surfaces to restore the solid data.

Next, the operation of the surface conversion and division mechanism 2 is described below in detail.

The surface conversion and division mechanism 2 obtains surface data of each face from face data in the original solid data, and converts the surface data into geometry data for the CAD apparatus 100. The original data may include a geometry that cannot be processed by using topology information the CAD apparatus 100 can process. Since the surface conversion and division mechanism 2 converts only geometry data, the surface conversion and division mechanism 2 can perform the conversion by putting the geometry data in a data structure. Further, the surface conversion and division mechanism 2 adds trim boundary curve information to the surface data. The trim boundary curve information can be obtained from topology information of the original data as follows.

In a case of a general solid in boundary representations, face data includes geometry information of a surface and information of a plurality of loops. The information of the plurality of loops includes edge information, and the edge information includes geometry information of a curve. Therefore, by sequentially referring to the information, boundary curve information can be referred to. When it is judged that the surface data cannot be processed by the CAD apparatus 100, the surface is divided together with the trim boundary curve information. The division can be achieved by using a background method.

Figure 2A:
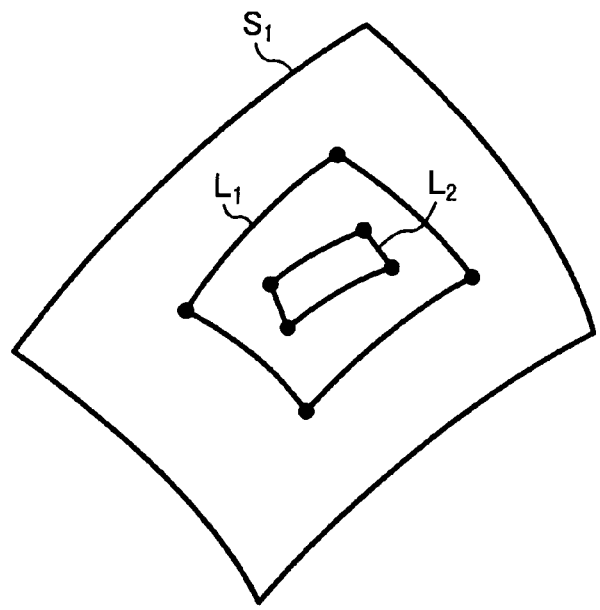
FIG. 2A is a schematic illustration of original face data to be processed by the three-dimensional geometry processing system.
Figure 2B:
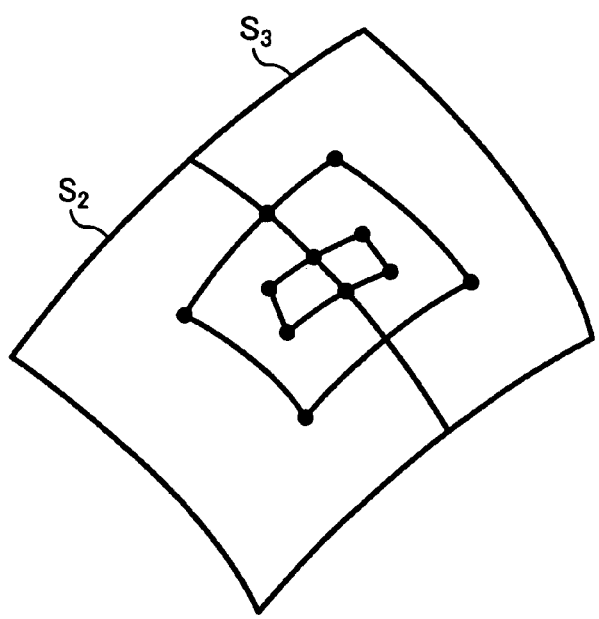
FIG. 2B is a schematic illustration of a result of division of a surface performed by the three-dimensional geometry processing system.

An example of the original face data is shown in FIG. 2A. The face includes a surface S1, and loops L1 and L2 on boundaries. When division is performed, the surface S1 is divided into surfaces S2 and S3 as shown in FIG. 2B, and an edge is generated. The edge is divided, and vertexes are generated.

Next, the topology information addition mechanism 3 adds IDs (i.e., identification information) of edges and vertexes of the original data to IDs of edges and vertexes of the data generated by the surface conversion and division mechanism 2. The addition is performed by referring to mapping between geometry information of the edges and vertexes of both data.

When a surface in the original data is divided to generate data, a single edge in the original data may be divided into a plurality of edges. In the case, the plurality of edges in the generated data can be mapped to the same edge in the original data. However, a vertex between the divided edges does not have a mating vertex in the original data. Therefore, for the vertex between the edges which mate with the same edge in the original data, data consistency can be verified by confirming that the vertex does not have a mating vertex in the original data.

Next, a flow of the operations of the 3D geometry processing system 1 is shown in FIG. 3. In step S1, surface data in the original data is converted into geometry data so that the CAD apparatus 100 can process it. In step S2, trim boundary curve information is derived from topology information of the original data, and is added to the surface data converted in the geometry data. In step S3, a surface in the surface data which cannot be processed by the CAD apparatus 100 is divided. In step S4, an edge and a vertex of the divided surface are mapped to an edge and a vertex in the original data. In step S5, edge and vertex processing is performed. In step S6, the divided surfaces are joined.

Figure 4A:
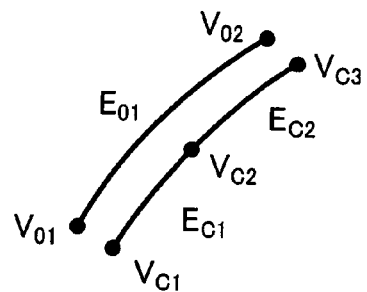
FIG. 4A is a schematic illustration of edges and vertexes of original data to be processed by the three-dimensional geometry processing system.

Examples of edges and vertexes in the original data, and examples of edges and vertexes of a divided surface are shown in FIG. 4A. As shown in FIG. 4A, an edge Eo1 representing the edge in the original data (hereinafter an ID of an edge in the original data such as Eo1 is referred to as an original edge ID) have two vertexes Vo1 and Vo2 at respective ends (hereinafter an ID of a vertex in the original data such as Vo1 is referred to as an original vertex ID). On the other hand, edges Ec1 and Ec2 represent the edges after conversion and division of the surface, and have vertexes Vc1, Vc2, and Vc3. The data shown in FIG. 4A can be mapped as follows.

Edge Ec1->Edge Eo1
Edge Ec2->Edge Eo1
Vertex Vc1->Vertex Vo1
Vertex Vc3->Vertex Vo2
Vertex Vc2->Has no mating vertex.

Although in the 3D geometry processing system 1 according to the embodiment of the present invention, the topology information addition mechanism 3 and the surface join mechanism 4 perform respective functions separately, the functions may be performed by the topology information addition mechanism 3 alone. When obtaining the trim boundary curve information, the topology information addition mechanism 3 maps the curve to an original edge ID thereof, and adds the original edge ID to an edge when the edge is generated.

After the mapping between the topology information of the original data and the topology information of the divided surfaces is finished, the topology information addition mechanism 3 performs the edge and vertex processing.

Finally, the surface join mechanism 4 joins mating surfaces to generate solid data of a closed solid object. The surfaces are joined according to, for example, a known method of joining loops by using combinations of basic operations. When joining the surfaces, the surface join mechanism 4 does not geometrically determine the identity of mating edges, but performs mapping by using an original edge ID assigned to an edge.

When an edge on a face F1 in the original data is divided into a plurality of edges (an edge group), the plurality of edges and vertexes are processed as follows.

A mating edge (group) on another face F2 which has the same original edge ID is located. Then, the following steps are performed on each vertex in the edge group on face F1. A vertex in a vertex group in the mating edge group on face F2 that geometrically coincides with the vertex in the edge group on face F1 is located. When there is corresponding vertex, an edge nearest to the vertex on the face F2 is divided to generate a vertex. The same original edge IDs are assigned to edges generated by the division. An original vertex ID is newly created so as not to overlap with IDs in the original data. The created vertex ID is assigned to the generated vertex. When there is a corresponding vertex, the created vertex ID is assigned to the corresponding vertex. The above steps are performed on a vertex in the mating edge group on face F2 which does not have an original vertex ID.

Figure 4B:
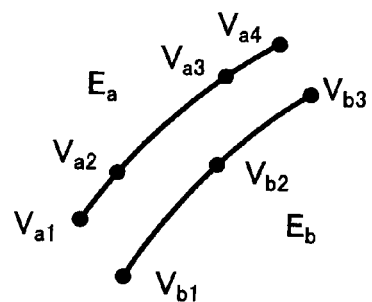
FIGS. 4B, 4C and 4d are schematic illustrations of divided edges and vertexes for explaining vertex processing of the three-dimensional processing system.
Figure 4C:
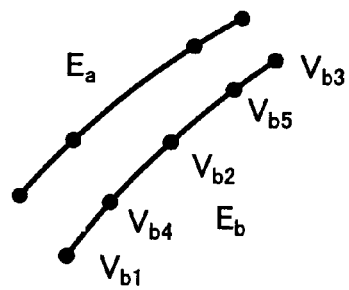
Figure 4D:
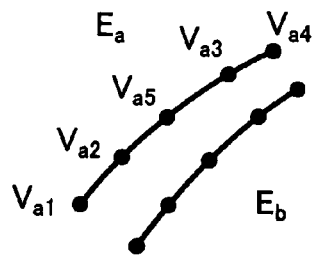

The vertex processing is performed, for example, as shown in FIGS. 4B, 4C, and 4D. Two curves Ea and Eb in FIG. 4B represent mating edges before processing. Vertexes corresponding to vertexes Va2 and Va3 on the curve Ea are generated on the curve Eb as shown in FIG. 4C. Then, a vertex Va5 corresponding to a vertex Vb2 on the curve Eb is generated on the curve Ea as shown in FIG. 4D.

Figure 5:
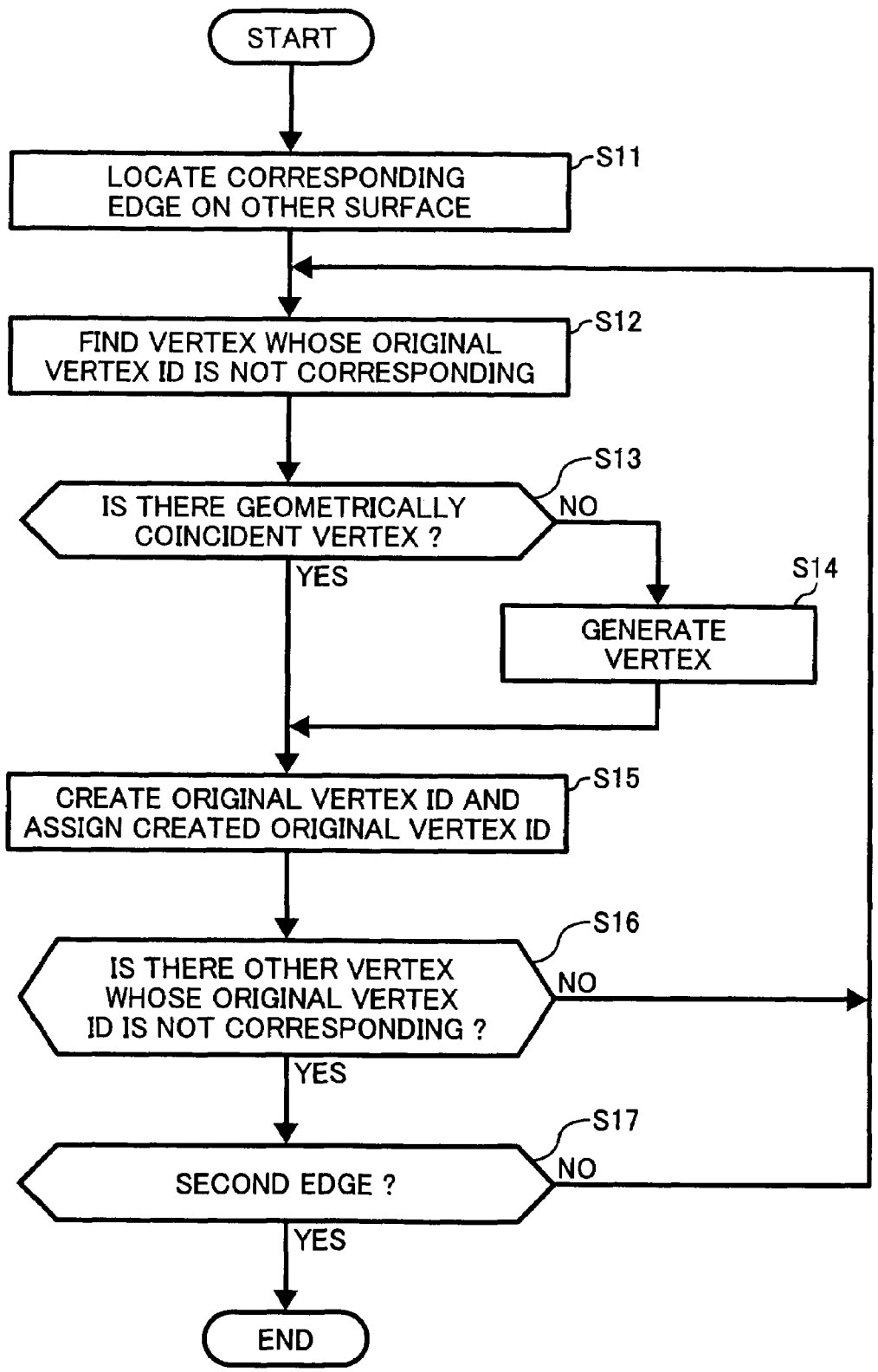
FIG. 5 is a flowchart of the vertex processing of the three-dimensional processing system.

Steps of the vertex processing on a face F11 are shown in a flowchart of FIG. 5. A mating edge (group) on another face F12 is located (step S11). A vertex not having mating vertex of which original vertex ID is the same as an original vertex ID of the vertex is located (step S12). It is then determined if there is a vertex which geometrically coincides with the vertex is checked (step S13). When there is no coinciding vertex, a vertex is generated (step S14). When a coinciding vertex is found, an original vertex ID is newly created so as not to overlap with IDs in the original data, and the created vertex ID is assigned to both vertexes (step S15). It is then determined if there is another vertex not having a mating vertex of which original vertex Id is the same as an original vertex ID of the vertex (step S16). When there is a vertex, steps S12 and after are repeated. When there is not a vertex, whether the edge is a second edge is checked (step S17). When the edge is not the second edge, steps S12 and after are repeated to process the second edge. When the edge is the second edge, the vertex processing on the edges in a pair is finished.

Since the vertex processing is performed as described above, faces to be joined have the same number of edges. Therefore, surfaces can be perfectly joined; as a result, a solid geometry can be generated.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A three-dimensional geometry processing system for converting boundary representations solid data in a first format into output solid data in a second format, comprising:
   a surface conversion and division mechanism configured to convert surface information in the boundary representations solid data having original data edges and vertexes into geometry data, and divide a surface which needs to be divided according to a restriction of the second format to generate topology information of the divided surfaces having divided surface edges and vertexes;
   a topology information addition mechanism configured to map topology information including identification information of the original data edges and vertexes of the boundary representations solid data to the topology information of the divided surfaces; and
   a surface join mechanism configured to join the divided surfaces based on the mapped topology information to generate the output solid data in the second format.

2. The three-dimensional geometry processing system according to claim 1, wherein the information of divided surface edges and vertexes are used as the topology information for joining the divided surfaces.

3. The three-dimensional geometry processing system according to claim 1, wherein the surface conversion and division mechanism is configured to divide a surface generated by division in the boundary representations solid data.

4. The three-dimensional geometry processing system according to claim 1, wherein the topology information addition mechanism is configured to generate a vertex corresponding to a vertex newly generated on the divided surface by referring to the geometry data and the topology information of the divided surfaces, and maps the referred information to the generated vertex.

5. A three-dimensional geometry processing method, comprising the steps of:
   converting surface information in a boundary representations solid data having original data edges and vertexes into geometry data;
   obtaining trim boundary curve information;
   dividing a surface which needs to be divided according to a restriction of a second format to generate topology information of the divided surfaces having divided surface edges and vertexes;
   mapping topology information including identification information of the original data edges and vertexes of the boundary representations solid data to the topology information of the divided surfaces;
   processing the original data surface edges and vertexes and the divided surface edges and vertexes; and
   joining the divided surfaces based on the mapped topology information to generate an output solid data in the second format.

6. The three-dimensional geometry processing method according to claim 5, wherein the information of divided surface edges and vertexes are used as the topology information for joining the divided surfaces.

7. The three-dimensional geometry processing method according to claim 5, wherein a surface generated by division in the boundary representation solid data is further divided.

8. The three-dimensional geometry processing method according to claim 5, wherein a vertex corresponding to a vertex newly generated on the divided surface is generated by referring to the geometry data and the topology information of the divided surfaces, and the referred information is mapped to the generated vertex.

9. A storage medium containing a program which when executed on a computer causes the computer to execute a three-dimensional geometry processing method comprising the steps of:

converting surface information in a boundary representations solid data having original data edges and vertexes into geometry data;

obtaining trim boundary curve information;

dividing a surface which needs to be divided according to a restriction of a second format to generate topology information of the divided surfaces having divided surface edges and vertexes;

mapping topology information including identification information of the original data edges and vertexes of the boundary representation solid data to the topology information of the divided surfaces;

processing the original data surface edges and vertexes and the divided surface edges and vertexes; and joining the divided surfaces based on the mapped topology information to generate an output solid data in the second format.

* * * * *